US012601525B2

(12) United States Patent
Arrojula et al.

(10) Patent No.: US 12,601,525 B2
(45) Date of Patent: Apr. 14, 2026

(54) WATER HEATER WITH ELECTRONIC MIXING VALVE AND AUTOMATIC TANK SET POINT

(71) Applicant: Haier US Appliance Solutions, Inc., Wilmington, DE (US)

(72) Inventors: Sukumar Arrojula, Louisville, KY (US); Joseph Mark Brian, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 977 days.

(21) Appl. No.: 17/698,127

(22) Filed: Mar. 18, 2022

(65) Prior Publication Data

US 2023/0296288 A1     Sep. 21, 2023

(51) Int. Cl.
*F24H 9/20* (2022.01)
*G05D 23/19* (2006.01)
*H04L 12/28* (2006.01)

(52) U.S. Cl.
CPC ....... *F24H 9/2021* (2013.01); *G05D 23/1905* (2013.01); *H04L 2012/2847* (2013.01)

(58) Field of Classification Search
CPC .............. F24H 9/2021; G05D 23/1905; H04L 2012/2847
See application file for complete search history.

(56) References Cited

U.S. PATENT DOCUMENTS

| | | | | |
|---|---|---|---|---|
| 9,390,381 | B2 * | 7/2016 | Davari | ................. F24H 15/156 |
| 10,316,981 | B2 | 6/2019 | Ward et al. | |
| 2016/0377323 | A1 * | 12/2016 | Ward | ........................ F24H 9/25 |
| | | | | 122/14.3 |
| 2021/0123634 | A1 | 4/2021 | Amin et al. | |

FOREIGN PATENT DOCUMENTS

| | | | |
|---|---|---|---|
| CN | 207540175 U | 6/2018 | |
| CN | 105605792 B | 6/2020 | |
| JP | 2009049852 A | * 3/2009 | ............... F24H 9/25 |

OTHER PUBLICATIONS

Machine Translation of JP2009049852A (Year: 2025).*

* cited by examiner

*Primary Examiner* — Edward F Landrum
*Assistant Examiner* — Thomas J Ward
(74) *Attorney, Agent, or Firm* — Dority & Manning, P.A.

(57) ABSTRACT

Methods of operating a water heater appliance are provided. The water heater appliance includes a tank, a cold water inlet conduit extending into the tank, a heating element within the tank, a hot water conduit extending from the tank to a mixing valve, a mixed water conduit downstream of the mixing valve, and a user interface. The method includes receiving a user input, determining a tank temperature setpoint value based on the received user input, and adjusting a tank temperature setpoint to the determined tank temperature setpoint value.

17 Claims, 6 Drawing Sheets

400

Receive A User Input That Does
Not Include A Tank Temperature
Setpoint

410

Determine A Tank Temperature
Setpoint Value Based On The
Received User Input

420

Adjust The Tank Temperature
Setpoint To The Determined Tank
Temperature Setpoint Value

430

500

Receive A User Input Other Than
A Tank Temperature Setpoint

510

Determine A Tank Temperature
Setpoint Value Based On The
Received User Input

520

Adjust The Tank Temperature
Setpoint To The Determined Tank
Temperature Setpoint Value

530

600

Receive A User Input That Consists
Of A Start Time, An End Time,
And No More Than Two Additional
Parameters

610

Determine A Tank Temperature
Setpoint Value Based On The
Received User Input

620

Adjust The Tank Temperature
Setpoint To The Determined Tank
Temperature Setpoint Value

630

WATER HEATER WITH ELECTRONIC MIXING VALVE AND AUTOMATIC TANK SET POINT

FIELD OF THE INVENTION

The present disclosure relates generally to water heater appliances, and more particularly to methods for controlling water heater appliances.

BACKGROUND OF THE INVENTION

Mixing valves in water heater appliances are generally used to increase the hot water capacity of hot water tanks of the water heater appliances. By increasing the temperature of the hot water in the hot water tank, and then mixing the hot water flow from the hot water tank with cold water in a mixing valve, the realized capacity of the hot water tank is increased.

However, improvements could be made to presently known methods for controlling such water heater appliances. For example, in many cases, the usage rate or demand for hot water from the water heater appliance varies over time. Thus, the increased energy consumption from increasing the temperature of the hot water in the hot water tank may not be desirable or necessary during times of relatively low use, whereas the increased realized capacity made possible by the increased temperature is desirable during times of relatively high use or high demand for hot water. When a temporary or time-limited increase in use is anticipated, it may be desirable to increase the effective capacity of the water heater in response to the anticipated use. However, adjusting the temperature of the hot water in the hot water tank may not directly relate to the anticipated increased use, which may result in over-adjustment and excessive energy consumption or under-adjustment and not meeting the anticipated usage requirements.

Accordingly, improved water heater appliances and methods for controlling water heater appliances are desired. In particular, methods of operating a water heater appliance that include automatically adjusting a temperature setpoint of the water heater based on a user input other than a temperature setpoint value would be useful.

BRIEF DESCRIPTION OF THE INVENTION

Aspects and advantages of the invention will be set forth in part in the following description, or may be obvious from the description, or may be learned through practice of the invention.

In one exemplary embodiment, a method of operating a water heater appliance is provided. The water heater appliance includes a tank, a cold water inlet conduit extending into the tank, a heating element within the tank, a hot water conduit extending from the tank to a mixing valve, a mixed water conduit downstream of the mixing valve, and a user interface. The method includes receiving a user input. The user input does not include a tank temperature setpoint value. The method also includes determining a tank temperature setpoint value based on the received user input and adjusting a tank temperature setpoint to the determined tank temperature setpoint value.

In another exemplary embodiment, a method of operating a water heater appliance is provided. The water heater appliance includes a tank, a cold water inlet conduit extending into the tank, a heating element within the tank, a hot water conduit extending from the tank to a mixing valve, a mixed water conduit downstream of the mixing valve, and a user interface. The method includes receiving a user input other than a tank temperature setpoint value. The method also includes determining a tank temperature setpoint value based on the received user input and adjusting a tank temperature setpoint to the determined tank temperature setpoint value.

In still another exemplary embodiment, a method of operating a water heater appliance is provided. The water heater appliance includes a tank, a cold water inlet conduit extending into the tank, a heating element within the tank, a hot water conduit extending from the tank to a mixing valve, a mixed water conduit downstream of the mixing valve, and a user interface. The method includes receiving a user input. The user input consists of a start time, an end time, and no more than two additional parameters. The method also includes determining a tank temperature setpoint value based on the received user input and adjusting a tank temperature setpoint to the determined tank temperature setpoint value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
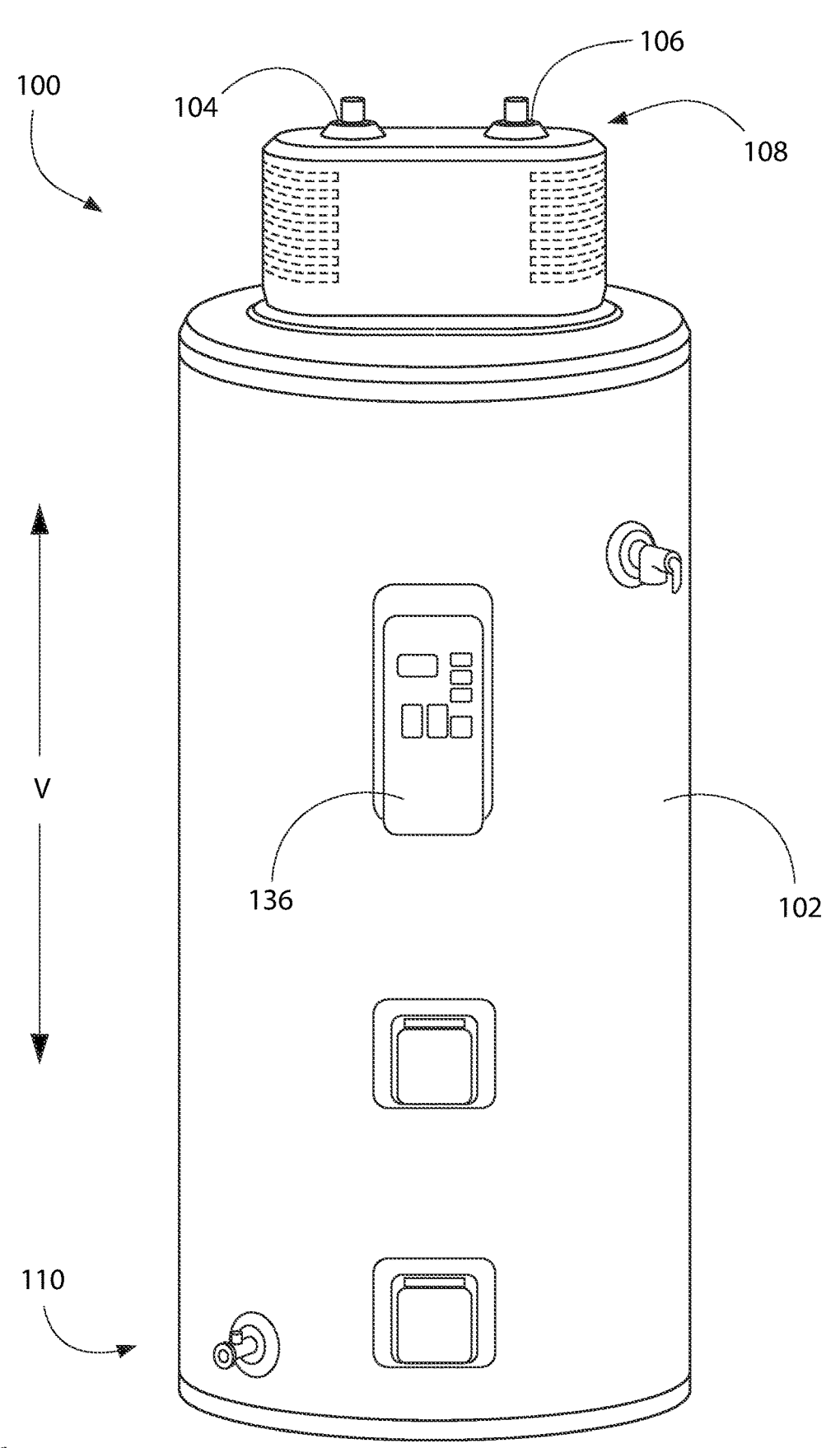
FIG. 1 is a front view of a water heater appliance in accordance with one or more exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

FIG. 1 illustrates an exemplary water heater appliance 100 according to an exemplary embodiment of the present subject matter. Water heater appliance 100 includes a casing 102. A tank 101 (FIG. 2) and heating elements 103 (FIG. 2) are positioned within casing 102 for heating water therein. Heating elements 103 may include a gas burner, a heat pump, an electric resistance element, a microwave element, an induction element, or any other suitable heating element or combination thereof. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

Water heater appliance 100 also includes a cold water conduit 104 and a hot water conduit 106 that are both in fluid communication with a chamber 111 (FIG. 2) defined by tank 101. As an example, cold water from a water source, e.g., a municipal water supply or a well, can enter water heater appliance 100 through cold water conduit 104 (shown schematically with arrow labeled in FIG. 2). From cold water conduit 104, such cold water can enter chamber 111 of tank 101 wherein it is heated with heating elements 103 to generate heated water. Such heated water can exit water heater appliance 100 at hot water conduit 106 and, e.g., be supplied to a bath, shower, sink, or any other suitable fixture.

Water heater appliance 100 extends longitudinally between a top portion 108 (FIG. 1) and a bottom portion 110 along a vertical direction V. Thus, water heater appliance 100 is generally vertically oriented. Water heater appliance 100 can be leveled, e.g., such that casing 102 is plumb in the vertical direction V, in order to facilitate proper operation of water heater appliance 100. It should be understood that water heater appliance 100 is provided by way of example only and that the present subject matter may be used with any suitable water heater appliance.

Figure 2:
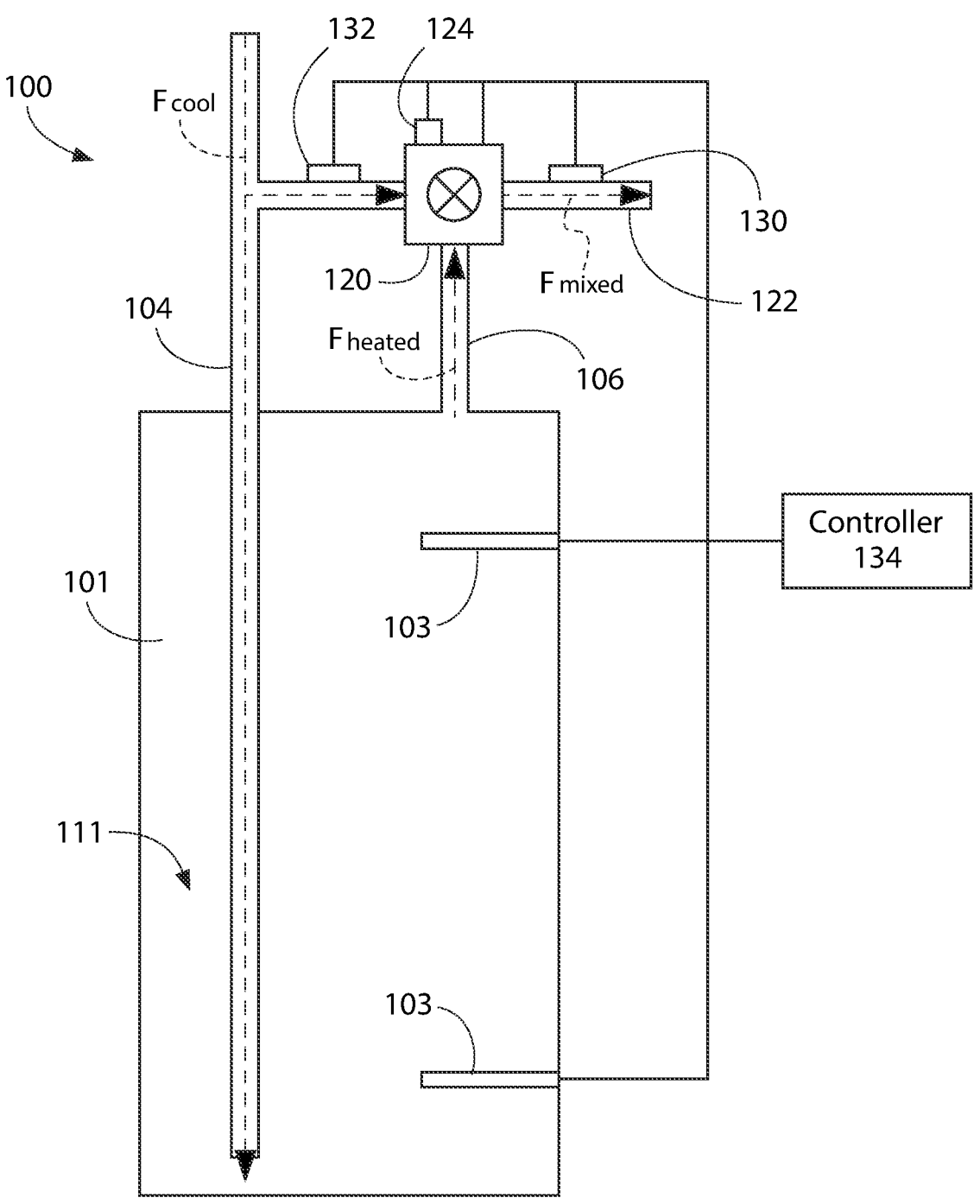
FIG. 2 is a schematic view of the water heater appliance of FIG. 1.

FIG. 2 provides a schematic view of certain components of water heater appliance 100. As may be seen in FIG. 2, water heater appliance 100 includes a mixing valve 120 and a mixed water conduit 122. Mixing valve 120 is in fluid communication with cold water conduit 104, hot water conduit 106, and mixed water conduit 122. As discussed in greater detail below, mixing valve 120 is configured for selectively directing water from cold water conduit 104 and hot water conduit 106 into mixed water conduit 122 in order to regulate a temperature of water within mixed water conduit 122.

As an example, mixing valve 120 can selectively adjust between a first position and a second position. In the first position, mixing valve 120 can permit a first flow rate of relatively cool water from cold water conduit 104 (shown schematically with arrow labeled $F_{cool}$ in FIG. 2) into mixed water conduit 122 and mixing valve 120 can also permit a first flow rate of relatively hot water from hot water conduit 106 (shown schematically with arrow labeled $F_{heated}$ in FIG. 2) into mixed water conduit 122. In such a manner, water within mixed water conduit 122 (shown schematically with arrow labeled $F_{mixed}$ in FIG. 2) can have a first particular temperature when mixing valve 120 is in the first position. Similarly, mixing valve 120 can permit a second flow rate of relatively cool water from cold water conduit 104 into mixed water conduit 122 and mixing valve 120 can also permit a second flow rate of relatively hot water from hot water conduit 106 into mixed water conduit 122 in the second position. The first and second flow rates of the relatively cool water and relatively hot water are different such that water within mixed water conduit 122 can have a second particular temperature that is different from the first particular temperature when mixing valve 120 is in the second position. In such a manner, mixing valve 120 can regulate the temperature of water within mixed water conduit 122 and adjust the temperature of water within mixed water conduit 122 between the first and second particular temperatures.

It should be understood that, in certain exemplary embodiments, mixing valve 120 is adjustable between more positions than the first and second positions. In particular, mixing valve 120 may be adjustable between any suitable number of positions in alternative exemplary embodiments. For example, mixing valve 120 may be infinitely adjustable between and including a full cold position and a full hot position, in order to permit fine-tuning of the temperature of water within mixed water conduit 122.

Water heater appliance 100 also includes a position sensor 124. Position sensor 124 is configured for determining a position of mixing valve 120. Position sensor 124 can monitor the position of mixing valve 120 in order to assist with regulating the temperature of water within mixed water conduit 122. For example, position sensor 124 can determine when mixing valve 120 is in the first position or the second position in order to ensure that mixing valve 120 is properly or suitably positioned depending upon the temperature of water within mixed water conduit 122 desired or selected. Thus, position sensor 124 can provide feedback regarding the status or position of mixing valve 120.

Water heater appliance 100 also includes a mixed water conduit temperature sensor or first temperature sensor 130 and a cold water conduit temperature sensor or second temperature sensor 132. First temperature sensor 130 is positioned on or proximate to mixed water conduit 122 and is configured for measuring a temperature of water within mixed water conduit 122. First temperature sensor 130 is also positioned downstream of mixing valve 120. Second temperature sensor 132 is positioned on or proximate to cold water conduit 104 and is configured for measuring a temperature of water within cold water conduit 104. Second temperature sensor 132 is positioned upstream of mixing valve 120. In certain exemplary embodiments, first temperature sensor 130 and/or second temperature sensor 132 may be positioned proximate or adjacent mixing valve 120.

Water heater appliance 100 further includes a controller 134 that is configured for regulating operation of water heater appliance 100. Controller 134 is in, e.g., operative, communication with heating elements 103, mixing valve 120, position sensor 124, and first and second temperature sensors 130 and 132. Thus, controller 134 can selectively activate heating elements 103 in order to heat water within chamber 111 of tank 101. Similarly, controller 134 can selectively operate mixing valve 120 in order to adjust a position of mixing valve 120 and regulate a temperature of water within mixed water conduit 122.

Controller 134 includes memory and one or more processing devices such as microprocessors, CPUs or the like, such as general or special purpose microprocessors operable to execute programming instructions or micro-control code associated with operation of water heater appliance 100. The memory can represent random access memory such as DRAM, or read only memory such as ROM or FLASH. The processor executes programming instructions stored in the memory. The memory can be a separate component from the processor or can be included onboard within the processor. Alternatively, controller 134 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 134 may be programmed to operate the water heater appliance 100 by executing instructions stored in memory. For example, the instructions may be software or any set of instructions that when executed by the processing device, cause the processing device to perform operations. Controller 134 can include one or more processor(s) and associated memory device(s) configured to perform a variety of computer-implemented functions and/or instructions (e.g. performing the methods, steps, calculations and the like and storing relevant data as disclosed herein). It should be noted that controllers 134 as disclosed herein are capable of and may be operable to perform any methods and associated method steps as disclosed herein.

Controller 134 can be positioned at a variety of locations. In the exemplary embodiment shown in FIG. 1, controller 134 is positioned within water heater appliance 100, e.g., as an integral component of water heater appliance 100. In alternative exemplary embodiments, controller 134 may be positioned away from water heater appliance 100 and communicate with water heater appliance 100 over a wireless connection, e.g., over the internet or via the cloud, or any other suitable connection, such as a wired connection.

The controller 134 may also include or be coupled to a user interface 136 (FIG. 1). The user interface 136 may comprise any suitable control or display that will allow a user to program, set, and adjust the functions and settings of the water heater appliance 100, as are generally described herein. In some exemplary embodiments, the user interface 136 may comprise a display interface, such as a touch screen display. In some exemplary embodiments, the user interface 136 may also or instead include mechanical buttons or switches for manipulating and programming the settings of the water heater appliance 100, including, for example, the setpoint temperature. In some exemplary embodiments, the user interface 136 may comprise or be part of a control panel for the water heater appliance 100. The user interface 136 may also be located remotely from the water heater appliance 100, and may be accessible through a computing device that is remote from the water heater appliance 100 or through a web-based interface.

Controller 134 can operate heating elements 103 to heat water within chamber 111 of tank 101. As an example, a user can select or establish a setpoint temperature for water within chamber 111 of tank 101, e.g., via the user interface 136 as described above, or the setpoint temperature for water within chamber 111 of tank 101 may be a default value. Based upon the setpoint temperature for water within chamber 111 of tank 101, controller 134 can selectively activate heating elements 103 in order to heat water within chamber

111 of tank 101 to the setpoint temperature for water within chamber 111 of tank 101. The setpoint temperature for water within chamber 111 of tank 101 can be any suitable temperature. For example, the setpoint temperature for water within chamber 111 of tank 101 may be between about one hundred and forty degrees Fahrenheit and about one hundred and eighty degrees Fahrenheit.

Controller 134 can also operate mixing valve 120 to regulate the temperature of water within mixed water conduit 122. For example, controller 134 can adjust the position of mixing valve 120 in order to regulate the temperature of water within mixed water conduit 122. As an example, a user can select or establish a setpoint temperature of mixing valve 120, or the setpoint temperature of mixing valve 120 may be a default value. Based upon the setpoint temperature of mixing valve 120, controller 134 can adjust the position of mixing valve 120 in order to change or tweak a ratio of relatively cool water flowing into mixed water conduit 122 from cold water conduit 104 and relatively hot water flowing into mixed water conduit 122 from hot water conduit 106. In such a manner, controller 134 can regulate the temperature of water within mixed water conduit 122.

The setpoint temperature of mixing valve 120 can be any suitable temperature. For example, the setpoint temperature of mixing valve 120 may be between about one hundred degrees Fahrenheit and about one hundred and twenty degrees Fahrenheit. In particular, the setpoint temperature of mixing valve 120 may be selected such that the setpoint temperature of mixing valve 120 is less than the setpoint temperature for water within chamber 111 of tank 101. In such a manner, mixing valve 120 can utilize water from cold water conduit 104 and hot water conduit 106 to regulate the temperature of water within mixed water conduit 122.

Figure 3:
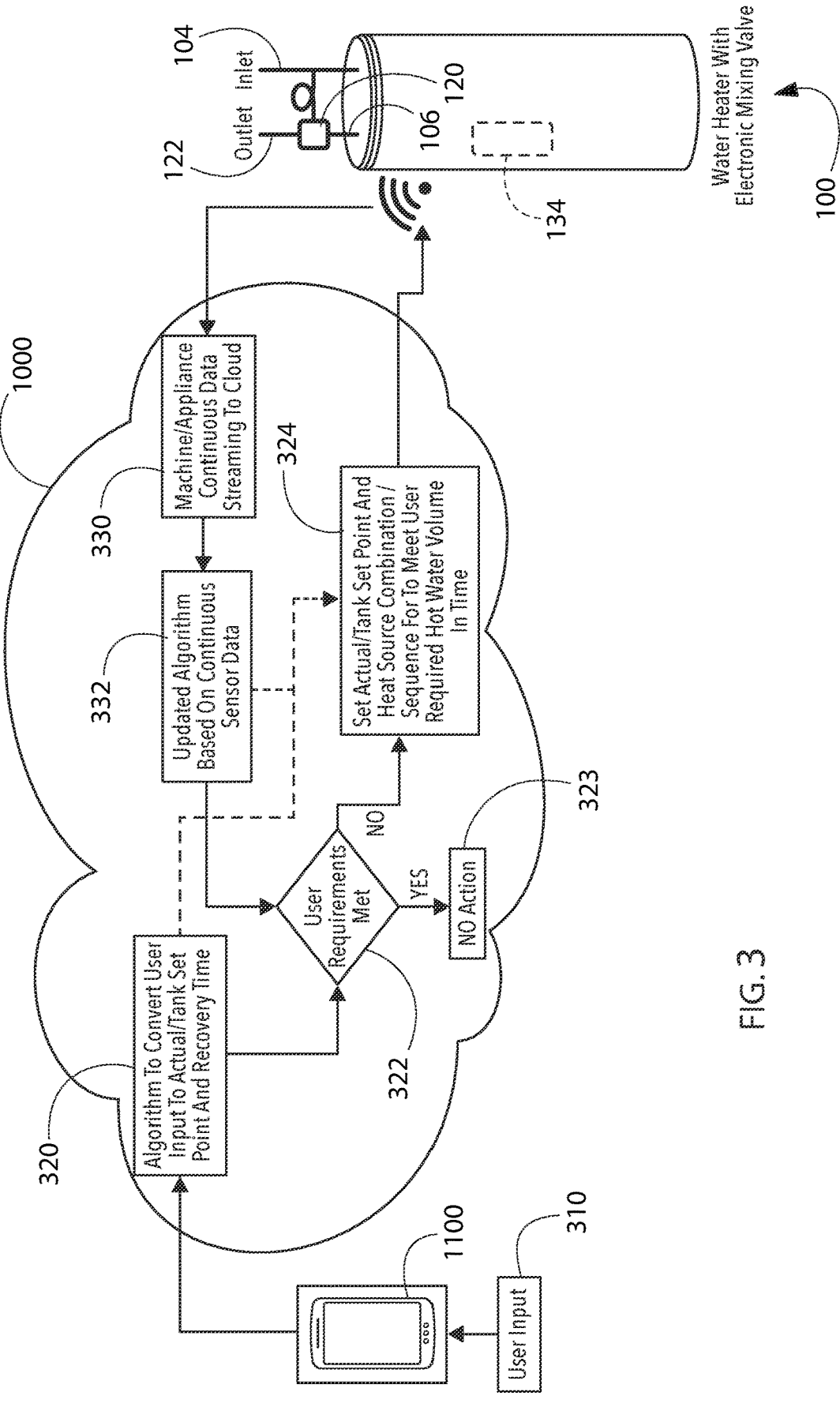
FIG. 3 provides a diagram of a water heater appliance, such as the water heater appliance of FIG. 1, in communication with a distributed computing environment.

FIG. 3 schematically illustrates a water heater appliance 100 in communication, e.g., wireless communication as illustrated in FIG. 3, with one or more remote computing devices in a distributed computing environment, such as a cloud 1000. For example, the water heater appliance 100, and in particular the controller 134 thereof, may be in communication with one or more remote computing devices, such as remote computers, servers, and/or databases, in the cloud 1000. As mentioned above, controller 134 is capable of and may be operable to perform any methods and associated method steps as disclosed herein.

The water heater appliance 100 may also be in wireless communication with a remote user interface device 1100, e.g., via a direct wireless connection and/or with data and other communications relayed between the water heater appliance 100 and the remote user interface device 1100 via the cloud 1000. The remote user interface device 1100 may be a laptop computer, smartphone, tablet, personal computer, wearable device, smart home system, and/or various other suitable devices.

The water heater appliance 100 may be in communication with the remote user interface device 1100 device through various possible communication connections and interfaces. The water heater appliance 100 and the remote user interface device 1100 may be matched in wireless communication, e.g., connected to the same wireless network. The water heater appliance 100 may communicate with the remote user interface device 1100 via short-range radio such as BLUETOOTH® or any other suitable wireless network having a layer protocol architecture. As used herein, "short-range" may include ranges less than about ten meters and up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the water heater appliance 100 and the remote user interface device 1100. For example, BLUETOOTH® Low Energy may advantageously minimize the power consumed by the exemplary methods and devices described herein due to the low power networking protocol of BLUETOOTH® Low Energy.

The remote user interface device 1100 is "remote" at least in that it is spaced apart from and not physically connected to the water heater appliance 100, e.g., the remote user interface device 1100 is a separate, stand-alone device from the water heater appliance 100 which communicates with the water heater appliance 100 wirelessly. Any suitable device separate from the water heater appliance 100 that is configured to provide and/or receive communications, information, data, or commands from a user may serve as the remote user interface device 1100, such as a smartphone (e.g., as illustrated in FIG. 3), smart watch, personal computer, smart home system, or other similar device. For example, the remote user interface device 1100 may be a smartphone operable to store and run applications, also known as "apps," and some or all of the method steps disclosed herein may be performed by a smartphone app.

The remote user interface device 1100 may include a memory for storing and retrieving programming instructions. Thus, the remote user interface device 1100 may provide a remote user interface which may be an additional user interface to the user interface 136. For example, the remote user interface device 1100 may be a smartphone operable to store and run applications, also known as "apps," and the remote user interface may be provided as a smartphone app.

In some embodiments, the performance of exemplary methods and associated method steps may be distributed, e.g., performed in part by the controller 134 and in part by one or more remote computing devices in the cloud 1000 and/or remote user interface device 1100. For example, embodiments of the present disclosure may include using a conversion algorithm to determine a tank temperature setpoint value, e.g., based on a user input that does not include a tank temperature setpoint value and/or a user input other than a tank temperature setpoint value. In such embodiments, the conversion algorithm may be derived, built, and/or updated based on data, which may be continuously received data from the water heater appliance, e.g., from one or more sensors such as temperature sensors 130, 132, position sensor 124, etc., thereof. The data may be analyzed or processed, e.g., in the cloud 1000 in embodiments which include distributed computing as described above, such as the data, e.g., sensor data, may be used by one or more remote computing devices in the cloud to build or update, etc., the conversion algorithm.

Exemplary methods according to the present disclosure may include receiving a user input 310. For example, the user input 310 may be received locally at the water heater appliance 100, such as via user interface 136 (FIG. 1). As another example the user input 310 may be received at remote user interface device 1100, e.g., as illustrated in FIG. 3, where the user input 310 is received by the remote user interface device 1100 and relayed to the water heater appliance 100 via the cloud 1000.

The user input 310 may be a user input other than a tank temperature setpoint, and the user input may not include a tank temperature setpoint. For example, the user input may include values or settings for various parameters of the water heater appliance 100 and/or end use requirements (user requirements) for hot water from the water heater appliance 100. In particular, the user input 310 may include a delivery temperature or end-use temperature, a volume of water, a number of events, and/or a time frame in which the use case will be needed. The "use case" refers to the volume and/or temperature of water to be used at or delivered to the end use point, or the number of events. The end-use temperature may correspond to, e.g., a mixed water temperature or a mixed water temperature plus an offset to account for heat loss between the mixing valve 120 and the end use point, e.g., showerhead, washing machine appliance, etc. The number of events may be a number of any water use events, such as a number of showers, a number of dishwasher cycles, a number of laundry cycles, etc., and may be provided in combination with a time frame, such as in a user input consisting of three showers within ninety minutes, among numerous other possible examples of events and time frames which may be included in a user input (e.g., where the user input is other than a tank temperature setpoint value and/or does not include a tank temperature setpoint value).

Still referring to FIG. 3, exemplary embodiments of the present disclosure may include method steps for converting or translating the user input 310 into a tank temperature setpoint value. Such embodiments may include a step 320 of using a conversion algorithm to convert the user input into an actual temperature, e.g., a tank temperature setpoint, and a recovery time that will meet the user requirements indicated by the user input.

Thus, the present disclosure may advantageously provide a more user-friendly and intuitive interface for the water heater appliances. For example, the present disclosure may permit a user to enter a desired outcome or other user requirements and have the water heater appliance automatically figure out what adjustments to make in order to achieve the desired outcome. Thus, the user would not have to convert the desired outcome into, e.g., a tank temperature setting, nor try to figure out by trial and error an optimal tank temperature setpoint value. Instead, the user input may have a simple, intuitive, and colloquial format that is readily understood by the user.

As illustrated in FIG. 3, the conversion algorithm may generate a tank temperature setpoint value, and the tank temperature setpoint value maybe compared to a current tank temperature setpoint, such as determining whether the generated tank temperature setpoint value that resulted from the conversion algorithm is greater than the current tank temperature setpoint (in which case the user requirements would not be met by the current tank temperature setpoint) or less than or equal to the current tank temperature setpoint (in which case the user requirements would be met by the current tank temperature setpoint).

When the user requirements are met, e.g., by the current tank temperature setpoint, the exemplary method may proceed to step 323 where no action is taken. When the user requirements are not met, the exemplary method may proceed to step 324 and adjust the water heater settings to meet the user requirements. As illustrated in FIG. 3, the tank temperature setpoint generated by the conversion algorithm, e.g., in the cloud 1000, may be transmitted to, and received and implemented by, the controller 134 of the water heater appliance 100. Additional settings for the water heater appliance 100 may be adjusted as well as or instead of the tank temperature setpoint. For example, the heat source combination or sequence of activation (such as activating an upper heating element and a lower heating element in a particular sequence or combination to meet the user requirements) may also or instead be adjusted as a result of and in response to the conversion algorithm.

As mentioned above, the conversion algorithm may be built, updated, etc., over time, such as in the cloud 1000. For example, as illustrated in FIG. 3, exemplary methods according to the present disclosure may include a step 330 of sending data from the water heater appliance 100 to the cloud 1000. In some embodiments, step 330 may be performed continuously, e.g., the water heater appliance 100 may continuously stream sensor data, e.g., from one or more temperature sensors 130, 132, position sensor 124, etc., to the cloud 1000. As illustrated in FIG. 3, such data may be used to build an updated conversion algorithm at step 332. In some embodiments, exemplary methods may further include applying the updated conversion algorithm to the received user input, such as in order to provide the most accurate conversion based on the actual operating performance of the water heater appliance 100. Thus, the methods may return to step 322 after updating the conversion algorithm at step 332 and again check whether the user requirements are being met and, if not, adjust one or more settings or operating parameters of the water heater appliance 100.

Some or all of the method steps described herein may be performed in the cloud 1000, e.g., as in the exemplary embodiment illustrated in FIG. 3, where steps 320, 322, 323, 324, 330, and 332 are performed in the cloud 1000. For example, the sensor data may be transmitted to the cloud 1000 from the water heater appliance 100, and the data may then be processed, e.g., according to some or all of the method steps described herein, in the cloud 1000.

Figure 4:
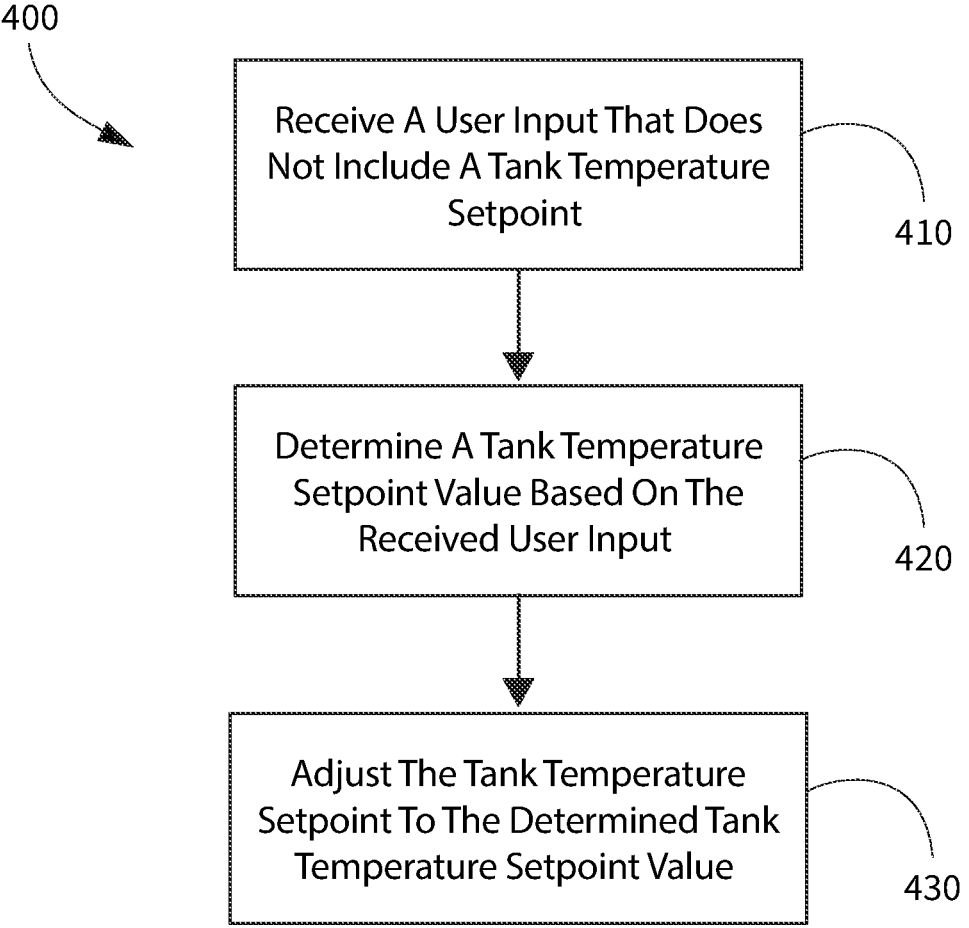
FIG. 4 is a flow chart illustrating a method of operating a water heater appliance in accordance with one or more exemplary embodiments of the present disclosure.
Figure 5:
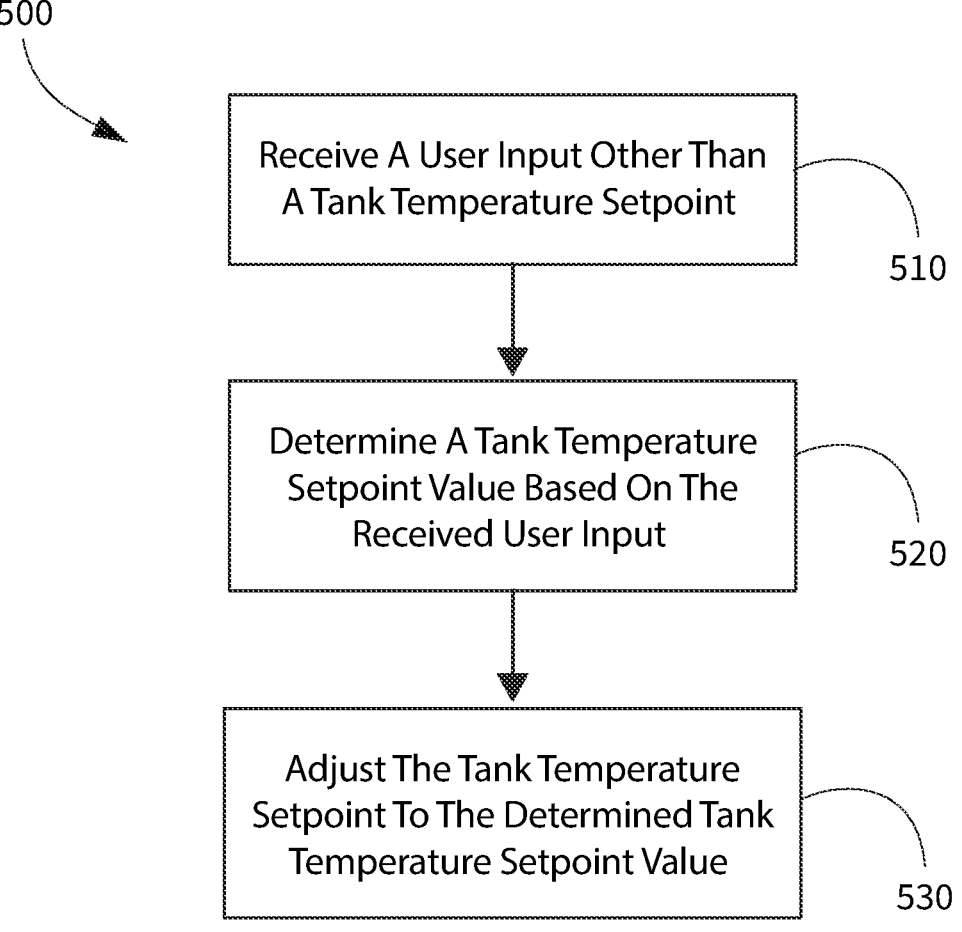
FIG. 5 is a flow chart illustrating another method of operating a water heater appliance in accordance with one or more additional exemplary embodiments of the present disclosure.
Figure 6:
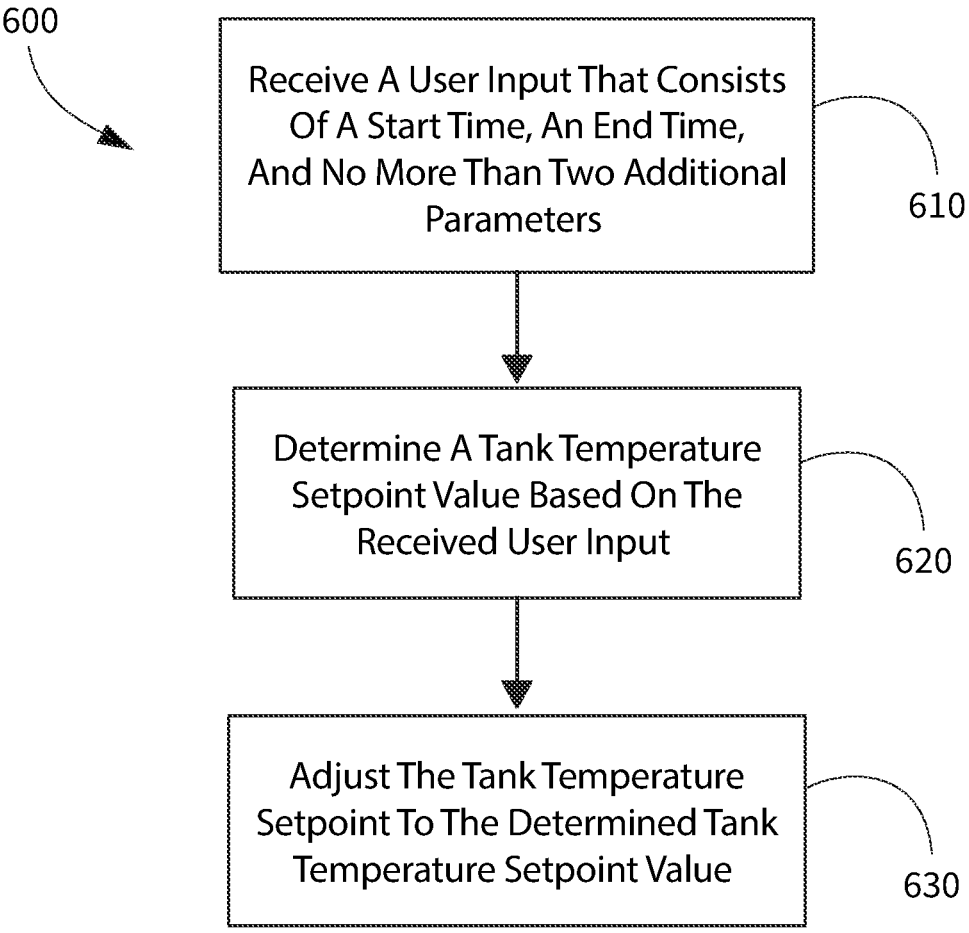
FIG. 6 is a flow chart illustrating yet another method of operating a water heater appliance in accordance with one or more further additional exemplary embodiments of the present disclosure.

Various exemplary methods of operating a water heater appliance are illustrated in FIGS. 4, 5, and 6. FIG. 4 illustrates an exemplary method 400 for operating a water heater appliance according to an exemplary embodiment of the present subject matter, FIG. 5 illustrates another exemplary method 500 for operating a water heater appliance according to an additional exemplary embodiment of the present subject matter, and FIG. 6 illustrates a further exemplary method 600 for operating a water heater appliance according to yet another exemplary embodiment of the present subject matter. Methods 400, 500, and 600 can be used to operate any suitable water heater appliance. For example, such methods may be utilized to operate water heater appliance 100 (FIG. 1). Controller 134 of water heater appliance 100 may be programmed to implement methods 400, 500, and/or 600, e.g., controller 134 is capable of and may be operable to perform any methods and associated method steps as disclosed herein. In some embodiments, the controller 134 may perform method steps in combination with one or more remote computing devices, such as a remote database or remote processor or one or more other remote computing devices, e.g., in the cloud. In such embodiments, the controller 134 may communicate with such remote computing device or devices via the internet, among other possible communications means. For example, some embodiments of the methods disclosed herein may include distributed computing whereby certain steps or calculations/determinations are performed locally, e.g., by the controller 134 onboard the water heater appliance 100, while other steps or calculations/determinations are performed by a remote computing device with which the controller 134 communicates via the internet.

Each method 400, 500, and 600 may include receiving a user input e.g., from a user interface of the water heater appliance or a remote user interface device, or other suitable user interface. For example, as illustrated in FIG. 4, the method 400 may include a step 410 of receiving a user input that does not include a tank temperature setpoint value. As another example, method 500 may include a step 510 of receiving a user input other than a tank temperature setpoint value, e.g., as illustrated in FIG. 5. In additional exemplary embodiments, method 600 may include a step 610 of receiving a user input that consists of a start time, an end time, and no more than two additional parameters.

In any or all of the exemplary methods 400, 500, and 600, the user input may include a start time and an end time. The start time and end time may, for example, reflect a duration for the user input, such as a duration for user requirements in the user input. As an example, the start time and end time may be certain hours of a day, or may be multiple days, such as when guests are staying for multiple days such that additional capacity, e.g., extra showers every morning, additional dishwasher cycles, etc., is desired for the duration of the stay, whereby the start time may be the arrival time or day and the end time may be the departure time or day. In various embodiments, the user input may include additional parameters along with the start time and end time. For example, the additional parameters may define user requirements and/or a time frame for the user requirements, e.g., as described above in reference to FIG. 3. Thus, the additional parameters may include a delivery temperature (end use temperature), a volume of water, a number of water use events, and a time frame, such as a time frame for the number of events or a time frame for the temperature and/or volume. In some embodiments, e.g., in method 600 illustrated in FIG. 6, the two or fewer additional parameters may include no more than two of the foregoing exemplary additional parameters.

Returning to the example of guests in the home mentioned above, the number of events may be a number of showers each morning for a certain number of days (the number of days being based on the start time and end time, as mentioned above), and the time frame may be the time during which the number of showers will occur. Thus, an exemplary user input may include a start day and an end day in combination with a number of events, e.g., four showers, and a time frame for the number of events, e.g., the four showers all occurring within an hour, or within ninety minutes, etc. In some embodiments, the user input may consist of the start time, the end time, the number of events, and the time frame, i.e., the user input may include only the start time, the end time, the number of events, and the time frame, with no additional parameters or settings.

The method 400, 500, and/or 600 may also include a step 420, 520, or 620 of determining a tank temperature setpoint value based on the received user input. In some embodiments, the method 400, 500, and/or 600 may then include a step 430, 530, or 630 of adjusting a tank temperature setpoint to the determined tank temperature setpoint value.

As mentioned, the determination at step 420, 520, or 620 of the tank temperature setpoint value based on the received user input may be made using a conversion algorithm. In some embodiments, the conversion algorithm may be or include a conversion factor for converting the user input into a tank temperature setpoint value. Referring again to the example described above, a conversion algorithm for user input that includes a number of showers may include a conversion factor to convert the number of showers into a volume of hot water needed. In such embodiments, the conversion algorithm may further convert the volume of hot water needed into a tank temperature setpoint value which will provide an effective capacity (realized capacity) of the water heater appliance that is equal to or greater than the volume of hot water needed. For example, e.g., where the user input includes a number of events, a conversion factor may be based on or correspond to a typical or average use for a particular event, such as seventeen and a half gallons (17.5 gal) of water per each shower, such that, in the example mentioned above where the number of events is four showers, the required volume of water from the hot water heater appliance would be seventy gallons (70 gal) over, e.g., an hour (or ninety minutes, etc., whatever the time frame of the user input may be, when a time frame is provided). In additional embodiments, the conversion algorithm may also or instead be based on time elements, a recovery curve of the water heater appliance, and/or other data, separately or in various combinations.

As referenced above, in some embodiments, determining the tank temperature setpoint value based on the received user input may include converting the user input into the tank temperature setpoint value using a conversion algorithm. The conversion algorithm may be a smart algorithm, e.g., may be updated with specific data from the water heater appliance. For example, exemplary methods 400, 500, and/ or 600 may include transmitting sensor data from the water heater appliance to a remote computing device, updating the conversion algorithm by the remote computing device based on the transmitted sensor data, and downloading, by the water heater appliance, the updated conversion algorithm from the remote computing device.

The data sent to the cloud may include one or more duty cycles, e.g., activation times and/or levels for heating elements or heat pumps of the water heater appliance, flow rates and other data (e.g., flow times or durations of sustained flow events above a threshold rate) from a flow meter of the water heater appliance, temperature values from one or more temperature sensors, etc., in various combinations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a water heater appliance, the water heater appliance comprising a tank, a cold water inlet conduit extending into the tank, a heating element within the tank, a hot water conduit extending from the tank to a mixing valve, a mixed water conduit downstream of the mixing valve, and a user interface, the method comprising:

receiving a user input from a remote user interface device via a cloud computing system, wherein the user input does not include a tank temperature setpoint value;

determining a first tank temperature setpoint value based on the received user input, wherein determining the first tank temperature setpoint value based on the received user input comprises converting, by the cloud computing system, the user input into the first tank temperature setpoint value using a conversion algorithm;

transmitting sensor data from the water heater appliance to the cloud computing system;

building, by the cloud computing system, an updated conversion algorithm using the transmitted sensor data;

determining a second tank temperature setpoint value based on the received user input, wherein determining the second tank temperature setpoint value based on the received user input comprises converting, by the cloud computing system, the user input into the second tank temperature setpoint value using the updated conversion algorithm;

adjusting a tank temperature setpoint to the determined second tank temperature setpoint value; and activating the heating element based on the adjusted tank temperature setpoint, whereby water within the tank is heated to the adjusted tank temperature setpoint.

2. The method of claim 1, wherein the user input comprises a start time and an end time.

3. The method of claim 2, wherein the user input further comprises an end-use temperature.

4. The method of claim 2, wherein the user input further comprises a volume of water and an end-use temperature.

5. The method of claim 2, wherein the user input further comprises a number of water-use events and a time frame of the number of water-use events.

6. The method of claim 1, further comprising downloading, by the water heater appliance, the updated conversion algorithm from the cloud computing system.

7. A method of operating a water heater appliance, the water heater appliance comprising a tank, a cold water inlet conduit extending into the tank, a heating element within the tank, a hot water conduit extending from the tank to a mixing valve, a mixed water conduit downstream of the mixing valve, and a user interface, the method comprising:

receiving a user input other than a tank temperature setpoint value via the user interface;

determining a first tank temperature setpoint value based on the received user input, wherein determining the first tank temperature setpoint value based on the received user input comprises converting, by the cloud computing system, the user input into the first tank temperature setpoint value using a conversion algorithm;

transmitting sensor data from the water heater appliance to the cloud computing system;

building, by the cloud computing system, an updated conversion algorithm using the transmitted sensor data;

determining a second tank temperature setpoint value based on the received user input, wherein determining the second tank temperature setpoint value based on the received user input comprises converting, by the cloud computing system, the user input into the second tank temperature setpoint value using the updated conversion algorithm;

adjusting a tank temperature setpoint to the determined second tank temperature setpoint value; and activating the heating element based on the adjusted tank temperature setpoint, whereby water within the tank is heated to the adjusted tank temperature setpoint.

8. The method of claim 7, wherein the user input comprises a start time and an end time.

9. The method of claim 8, wherein the user input further comprises an end-use temperature.

10. The method of claim 8, wherein the user input further comprises a volume of water and an end-use temperature.

11. The method of claim 8, wherein the user input further comprises a number of water-use events and a time frame of the number of water-use events.

12. The method of claim 7, further comprising downloading, by the water heater appliance, the updated conversion algorithm from the cloud computing system.

13. A method of operating a water heater appliance, the water heater appliance comprising a tank, a cold water inlet conduit extending into the tank, a heating element within the tank, a hot water conduit extending from the tank to a mixing valve, a mixed water conduit downstream of the mixing valve, and a user interface, the method comprising:

receiving a user input from a remote user interface device via a cloud computing system, wherein the user input consists of a start time, an end time, and no more than two additional parameters;

determining a first tank temperature setpoint value based on the received user input wherein determining the first tank temperature setpoint value based on the received user input comprises converting, by the cloud computing system, the user input into the first tank temperature setpoint value using a conversion algorithm;

transmitting sensor data from the water heater appliance to the cloud computing system;

building, by the cloud computing system, an updated conversion algorithm using the transmitted sensor data;

determining a second tank temperature setpoint value based on the received user input, wherein determining the second tank temperature setpoint value based on the received user input comprises converting, by the cloud computing system, the user input into the second tank temperature setpoint value using the updated conversion algorithm;

adjusting a tank temperature setpoint to the determined second tank temperature setpoint value;

activating the heating element based on the adjusted tank temperature setpoint, whereby water within the tank is heated to the adjusted tank temperature setpoint; and adjusting a position of the mixing valve based on the adjusted tank temperature setpoint.

14. The method of claim 13, wherein the user input consists of only one additional parameter, and the one additional parameter is an end-use temperature.

15. The method of claim 13, wherein the no more than two additional parameters consist of a volume of water and an end-use temperature.

16. The method of claim 13, wherein the no more than two additional parameters consist of a number of water-use events and a time frame of the number of water-use events.

17. The method of claim 13, further comprising downloading, by the water heater appliance, the updated conversion algorithm from the cloud computing system.

\* \* \* \* \*